Patented May 22, 1945

2,376,339

UNITED STATES PATENT OFFICE 2,376,339

POLYMERIZATION OF BUTADIENE-1,3 HYDROCARBONS

George L. Browning, Jr., and Benjamin M. G. Zwicker, Akron, Ohio, assignors, by mesne assignments, to The B. F. Goodrich Company, Akron, Ohio, a corporation of New York No Drawing. Application September 13, 1941,
Serial No. 410,780

8 Claims. (Cl. 260—79)

This invention relates to the polymerization of butadiene-1,3 hydrocarbons, and particularly to a method whereby butadiene-1,3 hydrocarbons may be polymerized in aqueous emulsion to form products closely resembling natural crude rubber.

The emulsion polymerization of mixtures of butadiene-1,3 hydrocarbons and alpha-methylene nitriles is well known. It has been commonly observed, however, that the products of such polymerization often resemble vulcanized rubber rather than natural crude rubber in respect to solubility, plasticity, and processing characteristics. Thus it has often been found that the polymers were insoluble in, and, in some cases, not even swelled by benzene or acetone, and that they were tough, non-plastic materials which either would not homogenize on a mill or which were very difficult to mill and to subject to other processing operations.

We have now discovered a class of materials which modifies the emulsion polymerization of mixtures of butadiene-1,3 hydrocarbons and alpha-methylene nitriles in such a manner that polymers more nearly resembling natural crude rubber may be produced than when the polymerization is effected in the absence of the materials of this invention. This class of materials, which we have termed "modifiers" consists of dithiocarbamates containing the group

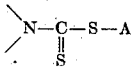

wherein A is a salt forming group such as a metal or a substituted ammonium group.

A wide variety of dithiocarbamates such as dimethyl, diethyl, di-n-propyl, di-n-butyl, diphenyl, phenyl-beta-naphthyl, dibenzyl, phenyl methyl, ditetrahydrofurfuryl, bis-chlormethyl, bis-methoxymethyl, and similar dithiocarbamates as well as dithiocarbamates derived from a nitrocyclic compound such as piperidine, morpholine, etc., may be employed. Metallic dithiocarbamates such as sodium, potassium, iron, cobalt, nickel, and chromium dithiocarbamates may be employed, the dithiocarbamates of metals which exhibit at least two different valences being preferred. Similarly, ammonium dithiocarbamates such as dimethylammonium, diethylammonium, dicyclohexylammonium, morpholinium, and piperidinium dithiocarbamates may be employed.

The effect of the dithiocarbamates on emulsion polymerization is shown by the copolymerization at 30° C. of 75 parts by weight of butadiene, and 25 parts of acrylonitrile in the presence of about 250 parts of a 3% aqueous solution of myristic acid which had been 85% neutralized with sodium hydroxide, and 0.35 part of hydrogen peroxide as an initiator. Although the polymer obtained by coagulating the latex formed by polymerization in the absence of any modifier was in the form of non-plastic, non-coherent crumbs which were only 1% soluble in benzene, the polymer obtained when 0.84 part of di-n-propylammonium di-n-propyldithiocarbamate was present during the polymerization was coherent and plastic and was 20% soluble in benzene. The modified polymer also exhibited higher tensile strength and elongation when tested in a tire tread recipe. Other dialkylammonium dialkyldithiocarbamates may be similarly employed.

In another specific example, a mixture of 75 parts of butadiene and 25 parts of acrylonitrile was agitated at 30° C. in the presence of about 250 parts of a 3% aqueous solution of myristic acid which had been 85% neutralized with sodium hydroxide, 0.35 part of hydrogen peroxide as an initiator, and .05 part of $CoCl_2 \cdot 2H_2O$ as a catalyst. The polymer so prepared was obtained in the form of non-coherent, non-plastic crumbs having a solubility in benzene of only 2%, while the polymer obtained by including 0.75 part of piperidinium cyclopentamethylenedithiocarbamate in the emulsion during the polymerization was a coherent, plastic material 17% soluble in benzene.

The proportion in which the modifier is included in the composition depends somewhat upon the properties desired in the product, the higher proportions of modifier in general producing softer, more soluble polymers. Very small amounts of modifier such as 0.1% or even less based on the monomers in the emulsion may profoundly affect the nature of the polymer produced, and amounts up to 5% or more may advantageously be employed. It may also be advantageous to employ a mixture of a dithiocarbamate modifier with other known types of modifiers such as dialkyl dixanthogens, tetraalkyl thiuram polysulfides, mercaptoalkylthiazoles or other types of compounds known to exhibit modifying activity in emulsion polymerizations.

The modifying agents of this invention may be employed in the polymerization of aqueous emulsions comprising a butadiene-1,3 hydrocarbon and from about 15 to 100% by weight based on the butadiene-1,3 hydrocarbon of an alpha-methylene nitrile. By the term "butadiene-1,3 hydrocarbon" is meant butadiene-1,3 (commonly termed butadiene) and its homologues which enter into polymerization reactions in essentially the same manner such as isoprene, piperylene, and 2,3-dimethyl butadiene. By the term "alpha-methylene nitrile" is meant a nitrile containing a methylene group attached to the carbon atom adjacent to the —C≡N group, such as acrylonitrile, alpha-methacrylonitrile, alpha-ethacrylonitrile, alpha-methyloxymethacrylonitrile, alpha-chlormethacrylonitrile, etc. Mixtures of butadiene hydrocarbons and mixtures of alpha-methylene nitriles may be employed in place of the single materials. The modifiers herein described cannot, as a class, be employed in the polymerization of butadiene hydrocarbons alone because of the extreme insolubility of certain members of the class such as piperidinium cyclopentamethylenedithiocarbamate in the butadiene hydrocarbons. The solubility of the class of compounds herein described in alpha-methylene nitriles, however, renders them suitable for use in the copolymerizations herein described.

The polymerization of the above materials in aqueous emulsion may be effected by various initiators of polymerization such as per-compounds including per-acids, peroxides, and per-salts such as persulfates, perborates, percarbonates, and the like as well as other types of initiators such as diazoaminobenzene and dipotassium diazomethane disulfonate.

The polymerization reactions may be catalyzed in any desired manner, the use of heavy metal catalysts being particularly desirable. The heavy metal catalyst may be added to the emulsion in the form of less than 0.1% based on the weight of the monomers of a simple ionizable heavy metal salt such as cobalt chloride, nickel sulfate, mercuric chloride, etc. as disclosed in the copending application of William D. Stewart, Serial No. 379,712 filed February 14, 1941, or in the form of a redox system comprising a heavy metal and a material such as sodium pyrophosphate, levulinic acid, glycine, cystine, beta-mercaptoethanol, quebrachitol, ox-bile or cholesterol as disclosed in the copending applications of William D. Stewart, Serial Nos. 379,713 to 379,717 filed February 14, 1941.

Any of the ordinary emulsifying agents such as fatty acid soaps including sodium oleate, potassium stearate, sodium myristate, etc. may be employed, as well as synthetic saponaceous materials such as hymolal suyfates and aryl sulfonates including sodium lauryl sulfate and sodium isopropyl naphthalene sulfonate.

Although we have herein disclosed specific embodiments of our invention, we do not intend to limit the invention solely thereto, for it will be obvious to those skilled in the art that many variations and modifications are within the spirit and scope of the invention as defined in the appended claims.

We claim:

1. The method which comprises polymerizing a mixture of a butadiene-1,3 hydrocarbon and from about 15 to 100% by weight based on the butadiene-1,3 hydrocarbon of an aliphatic alpha-methylene nitrile in the form of an aqueous emulsion in the presence of a small amount of a dithiocarbamate containing the group

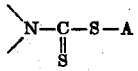

wherein the disconnected valences on the nitrogen atom are attached to carbon atoms present in substantially non-reactive organic groups and A is a cationic salt-forming group.

2. The method which comprises polymerizing a mixture of a butadiene-1,3 hydrocarbon and from about 15 to 100% by weight based on the butadiene-1,3 hydrocarbon of an aliphatic alpha-methylene nitrile in the form of an aqueous emulsion in the presence of a metallic dithiocarbamate.

3. The method which comprises polymerizing a mixture of a butadiene-1,3 hydrocarbon and from about 15 to 100% by weight based on the butadiene-1,3 hydrocarbon of an aliphatic alpha-methylene nitrile in the form of an aqueous emulsion in the presence of an ammonium dithiocarbamate.

4. The method which comprises polymerizing a mixture of butadiene-1,3 and from about 15 to 100% by weight based on the butadiene-1,3 of acrylonitrile in the form of an aqueous emulsion in the presence of a small amount of a dithiocarbamate containing the group

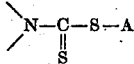

wherein the disconnected valences in the nitrogen atom are attached to carbon atoms present in hydrocarbon groups and A is a cationic salt-forming group.

5. The method which comprises polymerizing a mixture of butadiene-1,3 and from about 15 to 100% by weight based on the butadiene-1,3 of acrylonitrile in the form of an aqueous emulsion in the presence of an ammonium dithiocarbamate.

6. The method which comprises polymerizing a mixture of butadiene-1,3 and from about 15 to 100% based on the butadiene-1,3 of acrylonitrile in the form of an aqueous emulsion in the presence of piperidinium cyclopentamethylenedithiocarbamate.

7. The method which comprises polymerizing a mixture of butadiene-1,3 and from about 15 to 100% based on the butadiene-1,3 of acrylonitrile in the form of an aqueous emulsion in the presence of a dialkylammonium dialkyldithiocarbamate.

8. The method which comprises polymerizing a mixture of butadiene-1,3 and from about 15 to 100% based on the butadiene-1,3 of acrylonitrile in the form of an aqueous emulsion in the presence of di-n-propylammonium di-n-propyldithiocarbamate.

GEORGE L. BROWNING, Jr.
BENJAMIN M. G. ZWICKER.